No. 794,941. PATENTED JULY 18, 1905.
A. T. JONES.
ART OF PREPARING FOOD PRODUCTS.
APPLICATION FILED OCT. 22, 1900.
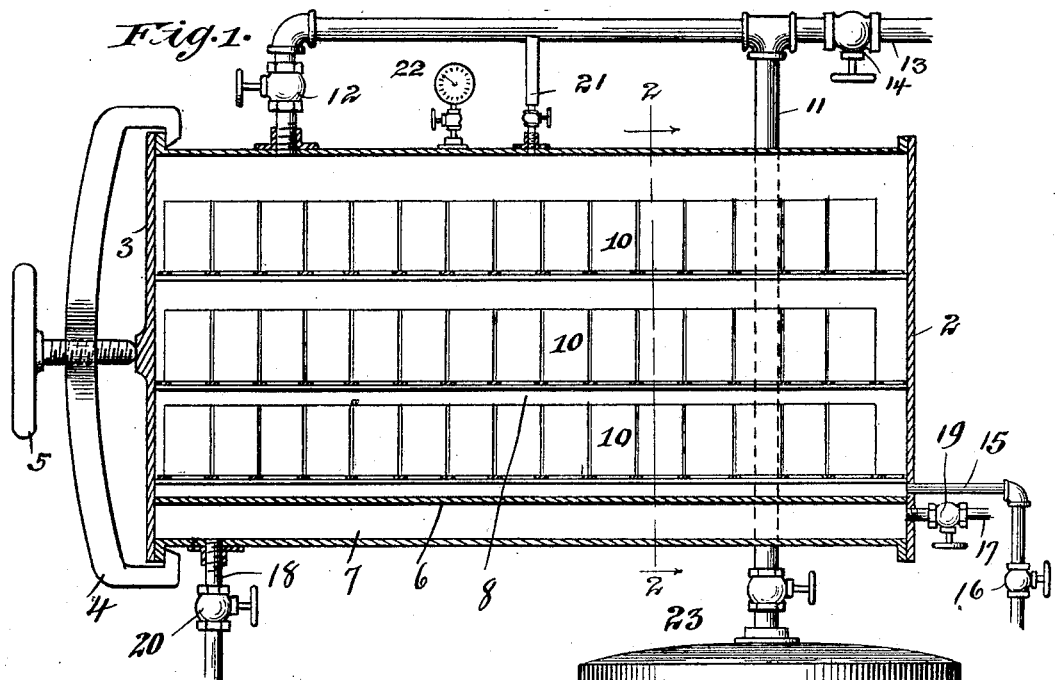
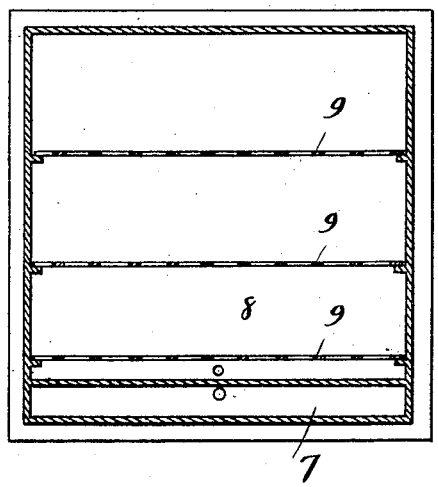
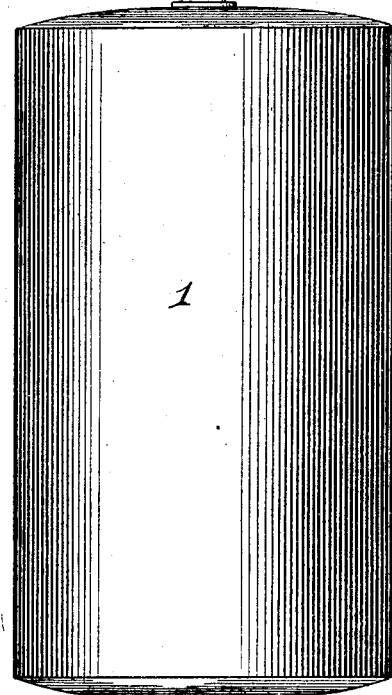
Witnesses,
Inventor,
Amanda T. Jones.
By Offield Towle & Linthicum
Attys.

No. 794,941.

Patented July 18, 1905.

UNITED STATES PATENT OFFICE.

AMANDA T. JONES, OF JUNCTION CITY, KANSAS.

ART OF PREPARING FOOD PRODUCTS.

SPECIFICATION forming part of Letters Patent No. 794,941, dated July 18, 1905.

Application filed October 22, 1900. Serial No. 33,917.

*To all whom it may concern:*

Be it known that I, AMANDA T. JONES, of Junction City, county of Geary, and State of Kansas, have invented certain new and useful Improvements in the Art of Preparing Food Products, of which the following is a specification.

This invention relates to an improved process for preparing food products, and refers more specifically to a method of cooking and sterilizing such products *in vacuo* either for future or immediate use.

The salient object of the invention is to provide an improved process whereby food products may be thoroughly cooked *in vacuo*, or in the absence of air, and in the presence of a heat-conducting vapor, thereby enabling the process to be carried out rapidly notwithstanding a relatively low temperature be employed and at the same time securing the highly-advantageous results obtainable by cooking *in vacuo*.

The invention consists in the matters hereinafter described, and more particularly pointed out in the appended claim, and will be readily understood from the following description, reference being had to the accompanying drawings, forming a part of said description.

It is to be understood that my improved process is adapted for use in preparing various kinds of food products both of the animal and vegetable kingdoms, and, furthermore, that while described with reference to its application to food products it is not to be thereby understood that the process is limited to such products; but it may, on the contrary, be found well adapted for other purposes.

In carrying out my improved process I first inclose the product to be heated in a hermetical inclosure and then proceed to expel the air, so as to produce a relatively perfect vacuum, such as would be indicated by approximately twenty-nine inches on the vacuum-gage. I produce this vacuum by charging a closed vessel, which may be thrown into communication with the hermetical inclosure containing the food product, with steam, then condense the steam therein, and thereafter open the communication between the two inclosures, so as to partially exhaust the inclosure containing the food product, and I repeat this operation until a vacuum is secured throughout the apparatus sufficiently perfect. Having thus secured the required vacuum, I subject the food products to a change of temperature for the purpose of still further expelling any air or deleterious elements which may still be retained in the product being treated. The products are allowed to remain subject to this vacuum-pressure for a sufficient period to permit the escape of as large a proportion of the contained air and gases as will be freed by the action of the vacuum-pressure acting unaided, and in the case of such products as are susceptible to rapid deterioration or such as require a relatively long period to permit the escape of the contained air and gases care is taken to maintain the temperature within the product-chamber low enough to arrest and prevent fermentation or other deterioration. If necessary, in case the process be carried on in a surrounding temperature high enough to permit the product to deteriorate, I use a cooling medium for maintaining the necessary low temperature. After the product has been subjected to this period of low temperature I subject it to a cooking process in the presence of vapor and while still *in vacuo*. To accomplish this cooking, I introduce within the product-receptacle a small quantity of water or other suitable liquid and apply sufficient heat to the lower part or that part of the vessel containing the water to vaporize the latter, and I continue this cooking process until the product has become sufficiently cooked and is ready for sealing or for other use.

The carrying out of the several steps in the process will be more fully understood by the description of the same in connection with a description of the use of a suitable apparatus therefor and with reference to the accompanying drawings, in which—

Figure 1 is a view, partly in elevation and partly in axial section, of an apparatus adapted for carrying out said process; and Fig. 2 is a transverse vertical sectional view taken on line 2 2 of Fig. 1 and looking in the direction of the arrows.

Describing a simple and preferred apparatus of this character, 1 designates as a whole a closed vessel or cylinder, which for convenience of description I will term an "exhauster," adapted to be charged with steam and to be used in producing a vacuum in the apparatus.

2 designates as a whole a second closed vessel, which for convenience I will designate a "keeper," adapted to be hermetically closed and provided with a relatively large removable closure 3, through which the product-receptacles may be inserted and removed, such keeper consisting in the present instance of a horizontally-disposed rectangular chamber, one entire end 3 of which is made removable and is held clamped in position to close the vessel by means of a clamping-yoke 4, provided with a hand-screw 5, adapted to act upon the central portion of said end wall, as indicated clearly in the drawings. Within the lower part of the keeper is arranged a horizontal diaphragm or partition 6, whereby its interior is completely divided into a relatively shallow lower chamber 7 and a larger product-chamber 8. The product-chamber is provided with a plurality of shelves or removable supports 9, arranged at intervals apart vertically above each other, said shelves being of open construction, so as to permit a free circulation of vapor throughout the interior of this chamber and being adapted to each support a series of product-receptacles—such, for example, as cans, as indicated at 10.

11 designates a pipe arranged to form a communication between the upper end of the exhauster 1 and the upper portion of the keeper, said pipe being provided with a suitable controlling-valve 12, whereby a communication between said receptacles may be closed. A steam-inlet pipe 13, communicating with any suitable source of steam-supply, admits steam to the pipe 11 and is provided with a controlling-valve 14. The lower part of the keeper is also provided with an inlet-pipe 15 for introducing a supply of liquid to the lower part of the product-chamber, this pipe being also provided with a controlling-valve 16. The lower chamber 7 of the keeper is provided with inlet and outlet pipes 17 and 18, each controlled by a suitable valve 19 and 20, respectively, whereby steam may be circulated through said chamber to impart heat to the liquid contained within the upper chamber. Desirably also the keeper is provided with a thermometer 21 and a vacuum-gage 22, whereby the temperature and vacuum obtaining within the keeper may be ascertained by inspection.

In carrying out my improved process by the use of said apparatus I first place the product to be treated within the keeper and hermetically close the same and then close the communication between the exhauster and keeper and charge the exhauster with steam, after which I close the inlet and outlet valves 23 and 24 thereof and drench the exhauster to condense the steam therein, and thus create a vacuum. I next open the valves controlling the communication between the exhauster and keeper and allow the pressure within the apparatus to become equalized, then close the communication between said vessels and repeat these several steps until a vacuum of the desired degree of perfectness has been obtained—ordinarily such a vacuum as would be indicated by twenty-nine inches or upward on the vacuum-gage.

The exhaustion of the product-chamber in case the product contained therein contains any considerable moisture exercises a refrigerating effect upon the interior of the chamber. In the case of treating such products as yield their air and contained gases slowly I permit the product to remain subject to the vacuum stress or pressure while maintained at a low temperature for a sufficient period to permit the escape of all or substantially all of the gases which will be drawn out by the effect of the vacuum thereon. If the product being treated is of a nature susceptible to rapid fermentation or other deterioration, care is taken to insure a temperature sufficiently low during this cool treatment to arrest and prevent the development of germs or fermentation. In order to insure this condition, the process may be carried on in a surrounding temperature sufficiently low or I may artificially cool the product by circulating a cool medium through the lower chamber 7 of the keeper. After the termination of this cool treatment the product is first warmed and then subjected to cooking in the presence of vapor. In order to accomplish this, a small supply of liquid is introduced to the lower part of the product-chamber through the inlet-pipe 15, care being taken to introduce this liquid in such manner that no air will obtain access to the chamber. This may be readily accomplished by applying a vessel containing water to the downwardly-extending end of said inlet-pipe, so as to submerge the inlet, and opening the valve, allowing the liquid to enter under atmospheric pressure, and closing the valve before the inlet-pipe is unsealed. It may be noted in this connection that the supply of liquid required in the lower part of the product-chamber will be relatively small, this quantity being preferably so regulated that it may be entirely converted into steam without creating an abnormal pressure under ordinary temperature, and it may be further noted in this same connnection that the liquid may be introduced before the vacuum process is begun, but is preferably introduced afterward.

In carrying out the cooking step of the process I circulate steam through the lower chamber 7 of the keeper, and thereby raise the temperature of the liquid contained in the product-chamber to or above the cookingpoint, preferably to a temperature of 212° Fahrenheit, and maintain it at a regular and suitable temperature until the product has been thoroughly cooked. The circulating of steam through the lower chamber raises the temperature of the liquid contained in the upper chamber by direct conduction through the upper wall of said lower chamber and through the body of the liquid and creates a steam or vapor within the cooking-chamber, which obviously affords a perfect medium of transmitting the heat to the product contained in all parts of the chamber. The cooking is therefore carried out rapidly, effectively, and with the utmost uniformity, and it is to be noted in this connection that by the use of steam as a heating medium circulated through the lower chamber of the keeper I am enabled to maintain the temperature at an almost perfectly uniform degree and am therefore able to avoid all possibility of overcooking. The completion of the cooking step completes the process so far as concerned in the present invention, and the product may thereafter be removed from the vacuum-chamber and sealed while still hot or otherwise disposed of, as may be found convenient or desirable.

I claim—

The herein-described method of preserving food materials containing germs of rapid fermentation or decay, which consists in subjecting such materials to the action of a practically complete vacuum, lowering the temperature within the vacuum-chamber, keeping the materials cool for a period, and then while still retaining the materials in the vacuum-chamber cooking the materials by the aid of hot vapor generated within the said chamber, substantially as described.

AMANDA T. JONES.

Witnesses:
ALBERT H. GRAVES,
FREDERICK C. GOODWIN.